United States Patent
Park et al.

(10) Patent No.: US 11,333,595 B2
(45) Date of Patent: May 17, 2022

(54) MOISTURE PERMEABILITY MEASURING DEVICE

(71) Applicants: SAMSUNG DISPLAY CO., LTD., Yongin-Si (KR); UNIST (ULSAN NATIONAL INSTITUTE OF SCIENCE AND TECHNOLOGY), Ulsan (KR)

(72) Inventors: Junhyeong Park, Hwaseong-si (KR); Sangwoo Kim, Seoul (KR); Jaemin Shin, Suwon-si (KR); Hyejin Joo, Suwon-si (KR); Jongho Hong, Yongin-si (KR); Ju-Young Kim, Ulsan (KR); Yun Seok Nam, Ulsan (KR); Myoung Hoon Song, Ulsan (KR); Jeong-Hyun Woo, Ulsan (KR); Sang Yun Lee, Ulsan (KR)

(73) Assignees: Samsung Display Co., Ltd., Yongin-si (KR); UNIST (Ulsan National Institute of Science and Technology), Ulsan (KR)

( * ) Notice: Subject to any disclaimer, the term of this patent is extended or adjusted under 35 U.S.C. 154(b) by 291 days.

(21) Appl. No.: 16/555,979

(22) Filed: Aug. 29, 2019

(65) Prior Publication Data
US 2020/0150019 A1    May 14, 2020

(30) Foreign Application Priority Data
Nov. 12, 2018 (KR) .................. 10-2018-0138032

(51) Int. Cl.
*G01N 15/08* (2006.01)

(52) U.S. Cl.
CPC ................ *G01N 15/0806* (2013.01)

(58) Field of Classification Search
CPC ..................................... G01N 15/0806
USPC ....................................... 73/864.91
See application file for complete search history.

(56) References Cited

U.S. PATENT DOCUMENTS

| | | | | |
|---|---|---|---|---|
| 3,680,364 A | * | 8/1972 | Carrier | G01N 31/222 73/73 |
| 3,788,128 A | * | 1/1974 | Strohecker | E02D 1/027 73/73 |
| 4,455,864 A | * | 6/1984 | Wallner | G01N 13/04 73/64.47 |
| 5,659,130 A | * | 8/1997 | Chung | G01N 15/08 422/401 |

(Continued)

FOREIGN PATENT DOCUMENTS

| | | |
|---|---|---|
| JP | 4855276 B2 | 1/2012 |
| KR | 10-1535454 B1 | 7/2015 |

(Continued)

*Primary Examiner* — Nathaniel T Woodward
(74) *Attorney, Agent, or Firm* — Lewis Roca Rothgerber Christie LLP (57) ABSTRACT

A moisture permeability measuring device includes a first body member including a seating part, a flexible bottom plate to be arranged on the seating part, a flexible top plate to be arranged on the bottom plate, a holder part to fix a lower edge portion of the bottom plate and an upper edge portion of the top plate, and a second body member to be arranged on the holder part and having a through-hole defined in a region overlapping the top plate, and an area of the seating part on a plane is smaller than an area of the bottom plate on the plane.

18 Claims, 8 Drawing Sheets

(56) References Cited

U.S. PATENT DOCUMENTS

| | | | | |
|---|---|---|---|---|
| 5,907,091 | A * | 5/1999 | Pause | G01N 33/367 |
| | | | | 73/38 |
| 6,360,588 | B1 * | 3/2002 | Ross | G01N 13/04 |
| | | | | 73/38 |
| 6,477,888 | B1 * | 11/2002 | Mizobe | G01N 5/025 |
| | | | | 73/38 |
| 6,964,191 | B1 * | 11/2005 | Tata | G01N 15/082 |
| | | | | 73/38 |
| 7,555,934 | B2 * | 7/2009 | DeRoos | G01N 15/0826 |
| | | | | 73/38 |
| 7,631,538 | B2 * | 12/2009 | Imhof | G01N 25/56 |
| | | | | 73/24.04 |
| 2001/0006150 | A1 * | 7/2001 | Taniike | C12Q 1/004 |
| | | | | 204/403.14 |
| 2001/0034063 | A1 * | 10/2001 | Saunders | G01N 19/04 |
| | | | | 436/2 |
| 2002/0030044 | A1 * | 3/2002 | Brown | B01L 7/52 |
| | | | | 219/386 |
| 2017/0356893 | A1 | 12/2017 | Koo et al. | |

FOREIGN PATENT DOCUMENTS

| | | |
|---|---|---|
| KR | 10-1660282 B1 | 9/2016 |
| KR | 10-2017-0074791 A | 6/2017 |

\* cited by examiner

MOISTURE PERMEABILITY MEASURING DEVICE

CROSS-REFERENCE TO RELATED APPLICATION

This application claims priority to and the benefit of Korean Patent Application No. 10-2018-0138032, filed on Nov. 12, 2018 in the Korean Intellectual Property Office, the entire content of which is hereby incorporated by reference.

BACKGROUND

1. Field

Aspects of embodiments of the present disclosure herein relate to a moisture permeability measuring device.

2. Description of the Related Art

Recently, OLEDs have become increasingly important in the field of displays and are being widely applied to various applications from a small mobile phone to a large TV, for example. One of the major technologies regarding OLED displays is a gas barrier technology (moisture or oxygen blocking technology) or an encapsulation technology, both of which are related to the life span and durability of OLEDs.

That is, OLEDs are so sensitive to moisture that the water vapor transmission rate (WVTR) tolerance thereof is $10^{-6}$ g/m² day or less (the amount of water transmitted per day per square meter of a substrate). Since OLEDs currently use a glass substrate, there is no problem in the water vapor transmission rate of the substrate itself, and the problem of water vapor transmission is being tackled mainly by improving the barrier properties of packaging materials and sealing materials.

Meanwhile, devices such as flexible displays having a flexible shape or electronic papers are expected to occupy an important position in the future market since they are lighter, bendable, and foldable, unlike current rigid electronic products.

However, flexible electronic products of such type may cause a problem because they may use plastic (polymer), not glass, as a substrate. That is, a plastic substrate is constructed to have a structure having a free volume of low density between molecules, and, thus, a large amount of moisture may enter a device through the substrate itself, and the amount of moisture penetration at this time becomes $10^1$ g/m² day. Meanwhile, techniques for measuring the WVTR physical properties of a material are also very important. There are four representative WVTR measurement techniques, which are transmittance measurement, IR measurement, mass spectrometry, and calcium testing.

In particular, the calcium testing is a representative method for measuring the transmittance of an extremely small amount of $10^{-4}$ g/m² day or less, and is a method for measuring transmittance using UV-visible light to measure the degree of transparency of opaque calcium by a reaction with moisture, or using a change in electrical properties.

Typically, it is a method of measuring a change in electrical resistance of a reaction material by saturating water vapor with an inert gas or dry air and sending the same to an amount (e.g., a predetermined amount) of reaction material (for example, calcium), and thereby measuring WVTR.

SUMMARY

According to an aspect of embodiments of the present disclosure, a moisture permeability measuring device of an encapsulated sample for multi-bending is provided.

According to one or more embodiments of the inventive concept, a moisture permeability measuring device includes: a first body member including a seating part, a flexible bottom plate to be arranged on the seating part, a flexible top plate to be arranged on the bottom plate, a holder part to fix a lower edge portion of the bottom plate and an upper edge portion of the top plate, and a second body member to be arranged on the holder part and having a through-hole defined in a region overlapping the top plate, wherein an area of the seating part on a plane is smaller than an area of the bottom plate on the plane.

In an embodiment, the bottom plate may have a lower opening.

In an embodiment, the bottom plate may have a net pattern shape.

In an embodiment, the top plate may have an upper opening.

In an embodiment, the top plate may have a net pattern shape.

In an embodiment, a thickness of the bottom plate may be greater than a thickness of the top plate.

In an embodiment, the bottom plate may have a cut groove extended from an end of a corner of the bottom plate.

In an embodiment, the top plate may have a cut groove extended from an end of a corner of the top plate.

In an embodiment, the top plate and the bottom plate may be arranged in the seating part in a bent state.

In an embodiment, the top plate and the bottom plate may be arranged in the seating part in a state bent in two axes.

In an embodiment, each of the bottom plate and the top plate may include butyl, ethylene propylene, chloroprene, or silicone rubber sheet.

In an embodiment, the seating part may have a quadrangular shape and an edge of each of the bottom plate and the top plate may have a quadrangular shape.

In an embodiment of the inventive concept, a moisture permeability measuring device includes a first body member including a seating part, a bottom plate to be arranged on the seating part and including a lower edge portion, lower protrusions protruding upward from the lower edge portion, and a lower support portion connecting the lower protrusions, a top plate to be arranged on the bottom plate and covering the bottom plate, a holder part to fix the lower edge portion of the bottom plate and an upper edge portion of the top plate, and a second body member to be arranged on the holder part and having a through-hole defined in a region overlapping the top plate, In an embodiment, an outermost portion of each of the lower protrusions of the bottom plate may have a curvature.

In an embodiment, the lower support portion of the bottom plate may have a bent shape.

In an embodiment, the lower support portion of the bottom plate may have a shape bent in an axis.

In an embodiment, the lower support portion of the bottom plate may have a lower opening.

In an embodiment, the lower support portion of the bottom plate may have a net pattern shape.

In an embodiment, the top plate may include an upper edge portion, upper protrusions protruding upward from the upper edge portion, and an upper support portion connecting the upper protrusions.

In an embodiment, the upper support portion of the top plate may have a lower opening.

BRIEF DESCRIPTION OF THE FIGURES

The accompanying drawings are included to provide a further understanding of the inventive concept, and are incorporated in and constitute a part of this specification. The drawings illustrate some example embodiments of the inventive concept and, together with the description, serve to explain principles of the inventive concept. In the drawings.

DETAILED DESCRIPTION

In the present disclosure, when an element (or a region, a layer, a portion, etc.) is referred to as being "on," "connected to," or "coupled to" another element, it means that the element may be directly disposed on/connected to/coupled to the other element, or that one or more third elements may be disposed therebetween.

Like reference numerals refer to like elements. Also, in the drawings, the thickness, the ratio, and the dimensions of elements may be exaggerated for the purpose of description of technical contents.

The term "and/or" includes all combinations of one or more of which associated configurations may define.

It is to be understood that, although the terms "first," "second," etc. may be used herein to describe various elements, these elements should not be limited by these terms. These terms are used to distinguish one element from another. For example, a first element could be termed a "second" element, and, similarly, a second element could be termed a "first" element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. However, the terms are used as a relative concept and are described with reference to the direction indicated in the drawings.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

It is to be understood that the terms "comprise," or "have" are intended to specify the presence of stated features, integers, steps, operations, elements, components, or combinations thereof in the disclosure, but do not preclude the presence or addition of one or more other features, integers, steps, operations, elements, components, or combinations thereof.

Herein, some example embodiments of the inventive concept will be described with reference to the accompanying drawings.

Figure 1:
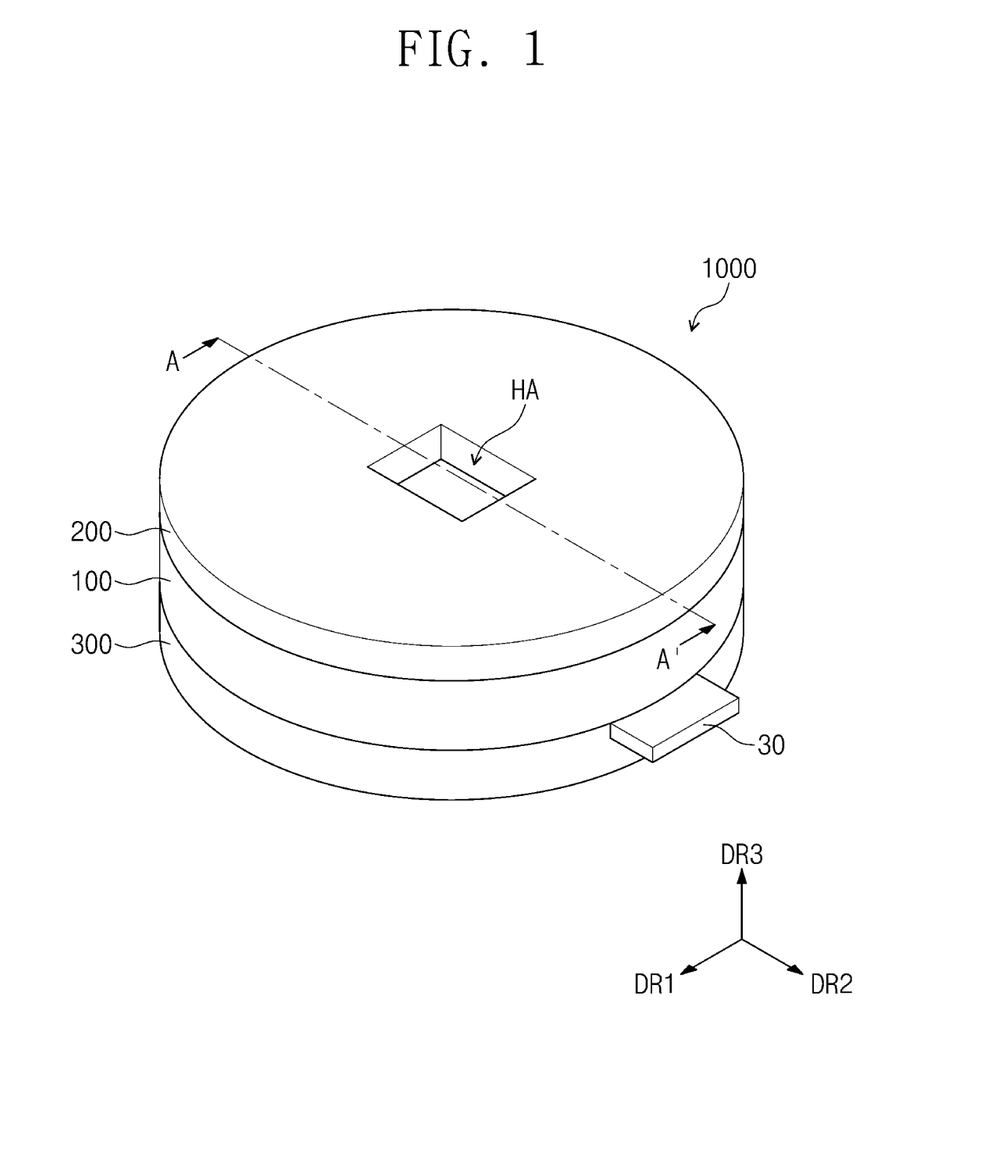
FIG. 1 is a perspective view of a moisture permeability measuring device according to an embodiment of the inventive concept.
Figure 2:
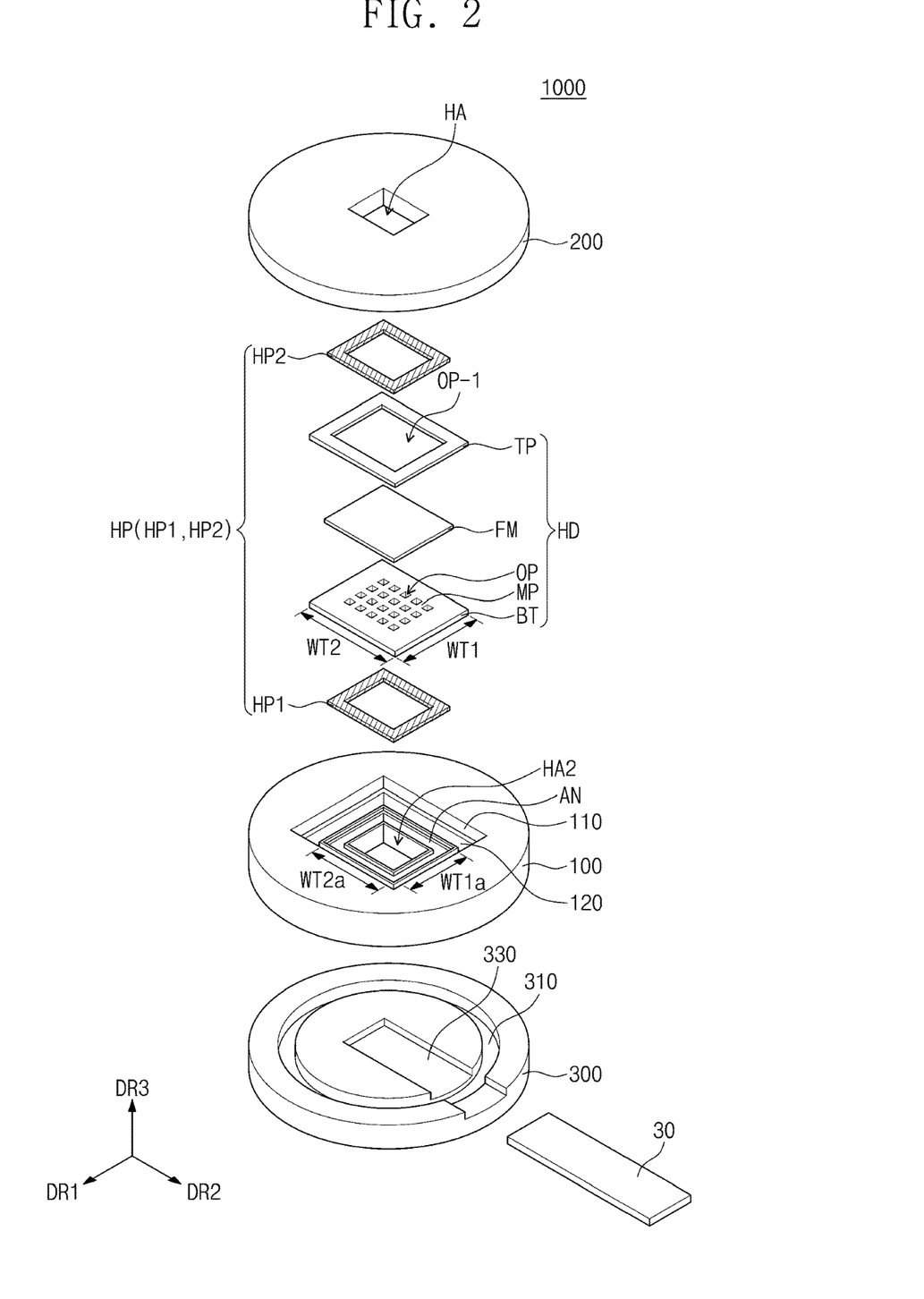
FIG. 2 is an exploded perspective view of the moisture permeability measuring device shown in FIG. 1.

FIG. 1 is a perspective view of a moisture permeability measuring device according to an embodiment of the inventive concept; and FIG. 2 is an exploded perspective view of the moisture permeability measuring device shown in FIG. 1.

Referring to FIG. 1 and FIG. 2, a moisture permeability measuring device 1000 includes a first body member 100, a second body member 200, and a sensing body member 300.

Above the sensing body member 300, the first body member 100 is disposed, and above the first body member 100, the second body member 200 may be disposed. The sensing body member 300, the first body member 100, and the second body member 200 may be sequentially disposed along a third direction DR3 perpendicular to a plane defined by a first direction DR1 and a second direction DR2. The third direction DR3 may be a direction intersecting the first direction DR1 and the second direction DR2. The first direction DR1, the second direction DR2, and the third direction DR3 may be orthogonal to each other.

However, directions indicated by the first to third directions DR1, DR2, and DR3 are a relative concept, and may be changed to different directions. Herein, the first to third directions refer to the same directions indicated by the first to third directions DR1, DR2, DR3, respectively, and refer to the same reference numerals. In addition, in the present specification, a surface defined by the first direction DR1 and the second direction DR2 is defined as a plane, and viewing on a plane may be defined as viewed from the third direction DR3.

The sensing body member 300 may include an upper surface, a lower surface spaced apart from the upper surface and, a side surface connecting the upper surface and the lower surface. In an embodiment, the sensing body member 300 may have a circular shape on a plane. However, this is only an example, and the sensing body member 300 may have any of various shapes, and is not limited to any one shape. For example, in an embodiment, the sensing body member 300 may have a quadrangular shape on a plane.

On the upper surface of the sensing body member 300, a first groove 330 may be defined. The first groove 330 may be provided concavely extended from a central region to the side surface of the sensing body member 300. In the first groove 330, a sensing member 30 may be disposed. In an embodiment, the sensing member 30 may be deposited with calcium (Ca) to sense moisture. For example, the sensing member 30 may measure transmittance by measuring a change in electrical resistance of calcium due to a reaction with moisture.

The first body member 100 may include an upper surface, a lower surface spaced apart from the upper surface, and a side surface connecting the upper surface and the lower surface. In an embodiment, the first body member 100 may have a circular shape on a plane. However, this is only an example, and the first body member 100 may have any of various shapes, and the first body member 100 has a same shape on a plane as the sensing body member 300.

The lower surface of the first body member 100 may be in close contact with the upper surface of the sensing body member 300. The sensing body member 300 may be provided with a third groove 310. The third groove 310 may be provided in a region adjacent to an edge of the sensing body member 300. In the third groove 310, a moisture removing agent 50 (see FIG. 7) may be disposed. The moisture removing agent 50 may block a gap between the first body member 100 and the sensing body member 300, and the moisture removing agent 50 may absorb moisture contained in the air. That is, the moisture removing agent 50 may prevent or substantially prevent moisture from passing through between the first body member 100 and the sensing body member 300 and permeating the sensing member 30.

On an upper surface of the first body member 100, a first coupling groove 110 may be provided, through which the second body member 200 may be inserted to be coupled to the first body member 100.

On a bottom surface of the first coupling groove 110, a first groove 120 may be provided. In an embodiment, the first groove 120 is provided with the moisture removing agent 50 (see FIG. 7) to remove moisture permeating between the first body member 100 and the second body member 200.

On the bottom surface of the first coupling groove 110, a seating part AN may be provided. On a plane, the seating part AN may be provided spaced apart from the first groove 120. The seating part AN may be defined as a portion having a concave shape from the bottom surface of the first coupling groove 110. In an embodiment, the seating part AN may have a quadrangular ring shape. However, this is only an example, and, in an embodiment, the seating part AN may have a same shape as an edge of a bottom plate BT.

The first body member 100 may have a second through-hole HA2 defined therein. The second through-hole HA2 may be adjacent to the seating part AN on a plane. In an embodiment, the second through-hole HA2 may have a quadrangular shape. However, this is only an example, and the second through-hole HA2 may have any of various shapes, and is not limited to any one embodiment. In an embodiment, the second through-hole HA2 may have a circular shape.

A holder HD may include the bottom plate BT and a top plate TP. Between the bottom plate BT and the top plate TP, a sample FM may be disposed.

The bottom plate BT may include a flexible material having flexibility. For example, the bottom plate BT may include butyl, ethylene propylene, chloroprene, or silicone rubber sheet. An edge of the bottom plate BT may have a quadrangular ring shape. However, this is only an example, and the edge of the bottom plate BT may have any of various shapes. For example, the edge of the bottom plate BT may have a circular shape. The bottom plate BT may have a lower opening defined therein. In a testing process, moisture that has passed through the sample FM may reach the sensing member 30 through the lower opening. For example, the bottom plate BT may include a net pattern portion MP. A plurality of lower openings OP may be defined by the net pattern portion MP. The net pattern portion MP of the bottom plate BT supports the sample FM to prevent the sample FM from falling downward. However, this is only an example, and the net pattern portion MP may be substituted with any of various shapes. For example, the net pattern portion MP may be substituted with a bar shape extending in one direction, or a cross shape.

The area of the bottom plate BT may be greater than the area of the seating part AN on a plane. The area of the bottom plate BT may refer to the area of the bottom plate BT before being deformed. In addition, the area of the bottom plate BT refers to the area of a region defined by the edge of the bottom plate BT, and the area of the seating part AN refers to the area of a region defined by the edge of the seating part AN.

In an embodiment, a width WT1 of the bottom plate BT in the first direction DR1 may be greater than a width WT1a of an outermost portion of the seating part AN in the first direction DR1. In an embodiment, a width WT2 of the bottom plate BT in the second direction DR2 may be greater than a width WT2a of the outermost portion of the seating part AN in the second direction DR2. Accordingly, when the bottom plate BT is coupled to the seating part AN, the shape of the bottom plate BT may be deformed. Accordingly, the area of the bottom plate BT may be the product of the width WT1 and the width WT2, and the area of the seating part AN may be the product of the width WT1a and the width WT2a.

In an embodiment, the top plate TP may include a flexible material having flexibility. For example, the top plate TP may include butyl, ethylene propylene, chloroprene, or silicone rubber sheet. In an embodiment, an edge of the top plate TP may have a quadrangular shape. However, this is only an example, and the edge of the top plate TP may be formed in various shapes, and the edge of the top plate TP may have a same shape as the edge of the bottom plate BT. The top plate TP may have an upper opening OP-1 defined therein. In an embodiment, the area of the top plate TP may be the same as the area of the bottom plate BT. The area of the top plate TP refers to the area of a region defined by the edge of the top plate TP.

In an embodiment, the thickness of the bottom plate BT may be greater than the thickness of the top plate TP in order to maintain a bent shape. For example, the thickness of the bottom plate BT may be 1 mm or greater.

The sample FM may be an object for measuring the moisture permeability. For example, the sample FM may be a plastic substrate, such as an encapsulation layer. However, this is only an example, and the sample FM may include any of various materials having flexibility.

The second body member 200 may include an upper surface, a lower surface spaced apart from the upper surface, and a side surface connecting the upper surface and the lower surface. In an embodiment, the second body member 200 may have a circular shape on a plane. However, this is only an example, and the second body member 200 may have any of various shapes and may have a same shape on a plane as the first body member 100.

Figure 7:
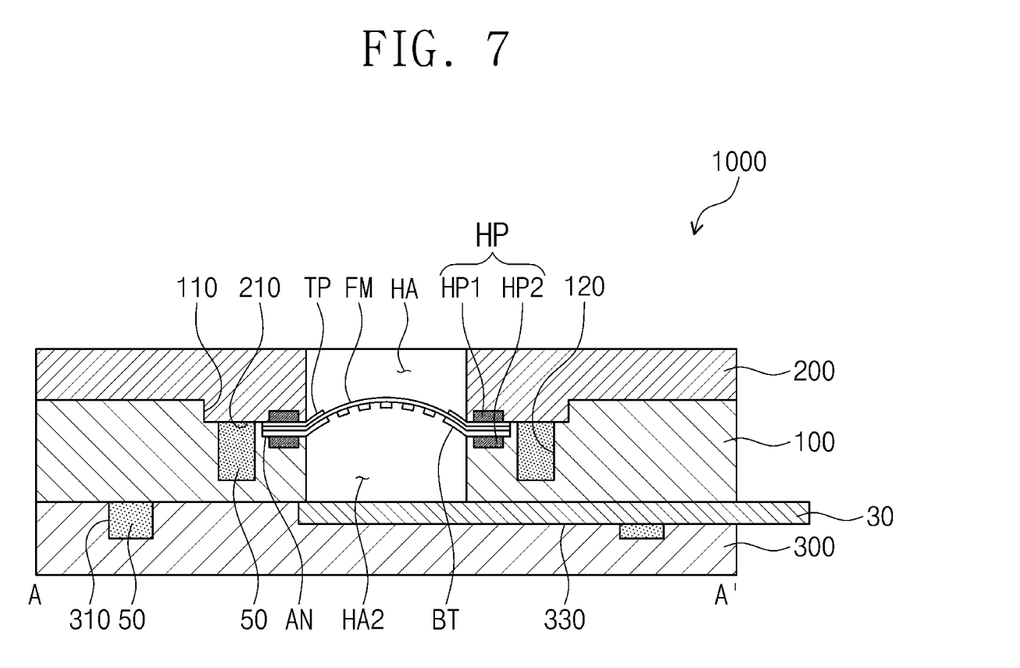
FIG. 7 is a cross-sectional view taken along the line A-A' of FIG. 1.

The second body member 200 may further include a coupling protrusion 210 (see FIG. 7). The coupling protrusion 210 may protrude from the lower surface of the second body member 200. The coupling protrusion 210 may be received in the first coupling groove 110 defined on the upper surface of the first body member 100. That is, as the coupling protrusion 210 is inserted into the first coupling groove 110, the first body member 100 and the second body member 200 may be assembled. The second body member 200 may have a through-hole HA to be passed through from the center in the third direction DR3. In an embodiment, the through-hole HA may have a quadrangular shape. However, this is only an example, and the through-hole HA may have a same shape as the second through-hole HA2. Through the through-hole HA, water vapor is injected, and the water vapor may be provided to the sample FM.

In an embodiment, when the second body member 200 and the first body member 100 are assembled, a holder part HP for fixing the holder HD may be provided. The holder part HP may include a first holder part HP1 and a second holder part HP2. The first holder part HP1 may fix the first body member 100 and the holder HD. The second holder part HP2 may fix the second body member 200 and the holder HD. The holder part HP may block a gap between the second body member 200 and the first body member 100. In an embodiment, each of the first holder part HP1 and the second holder part HP2 may have a quadrangular ring shape. However, this is only an example, and each of the first holder part HP1 and the second holder part HP2 may be provided in any of various shapes.

Figure 3:
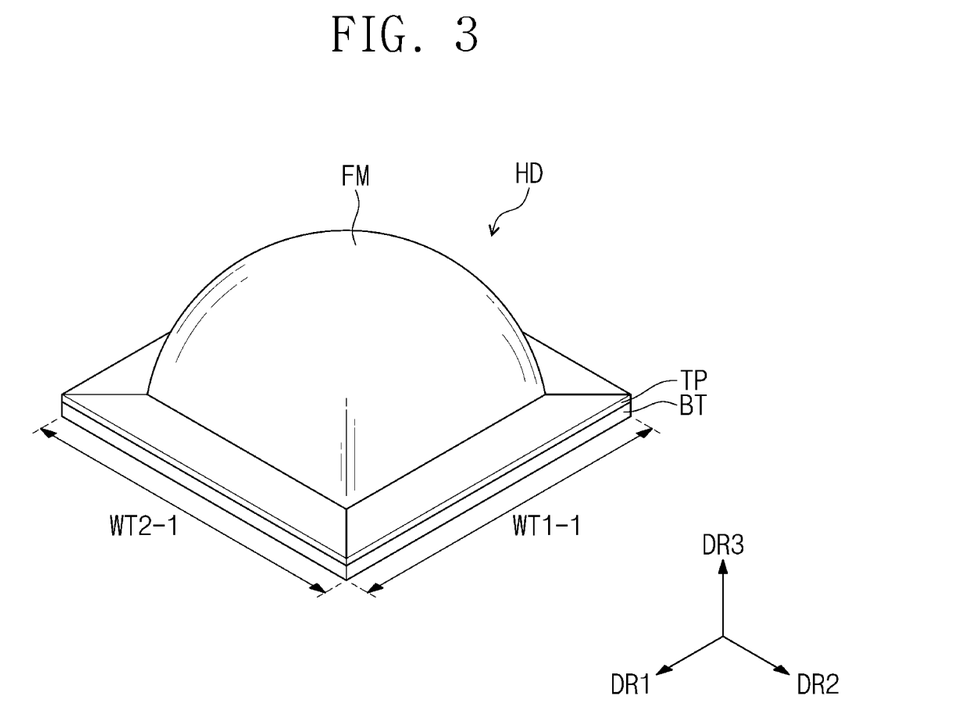
FIG. 3 is a perspective view showing a holder coupled to the seating part shown in FIG. 2.

FIG. 3 is a perspective view showing the holder HD coupled to the seating part AN shown in FIG. 2. In an embodiment, the area of the seating part AN is smaller than the area of the holder HD before being deformed, and in order for the holder HD to be coupled to the seating part AN, the shape of the holder HD is deformed.

Referring to FIG. 2 and FIG. 3, the holder HD may include a holder for multi-axial bending which bends in multiple axes. The holder HD may include the bottom plate BT and the top plate TP. In an embodiment, the bottom plate BT, the top plate TP, and the sample FM may include a flexible material having flexibility. For example, the bottom plate BT and the top plate TP may include butyl, ethylene propylene, chloroprene, or silicone rubber sheet. The bottom plate BT and the top plate TP may be bent under force. As the bottom plate BT and the top plate TP are bent, the sample FM may be bent as well. For example, the bottom plate BT, the top plate TP, and the sample FM may be bent in two axes.

In addition, the bottom plate BT, the top plate TP, and the sample FM may protrude from a plane in the third direction DR3. In an embodiment, the area of the bottom plate BT on a plane may be the same as the area of the seating part AN. In an embodiment, a width WT1-1 of the bottom plate BT in the first direction DR1 in a state of being coupled to the seating part AN may be the same as the width W1a of the outermost portion of the seating part AN in the first direction DR1. In an embodiment, a width WT2-1 of the bottom plate BT in the second direction DR2 in a state of being coupled to the seating part AN may be the same as the width WT2a of the outermost portion of the seating part AN in the second direction DR2. Accordingly, the bottom plate BT may be coupled to the seating part AN.

Figure 4A:
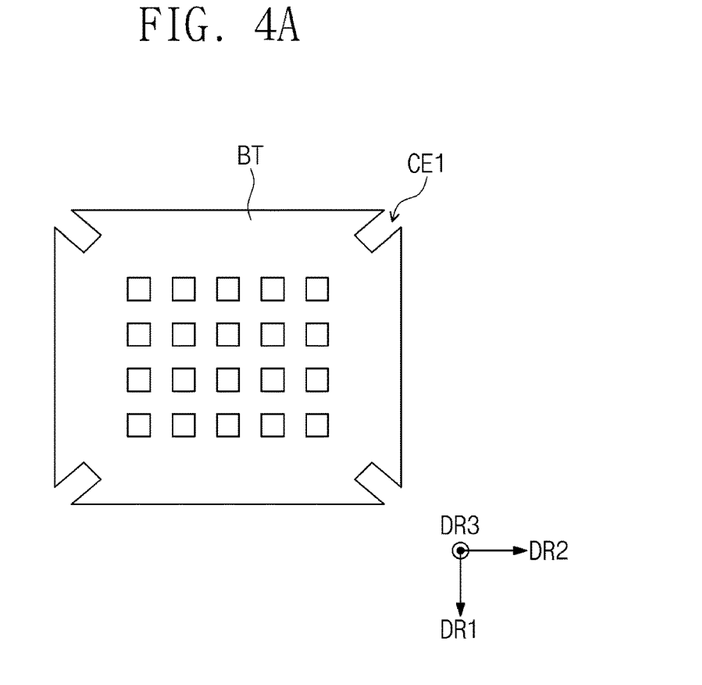
FIGS. 4A and 4B are plan views of a bottom plate of a moisture permeability measuring device according to some embodiments of the inventive concept.
Figure 4B:
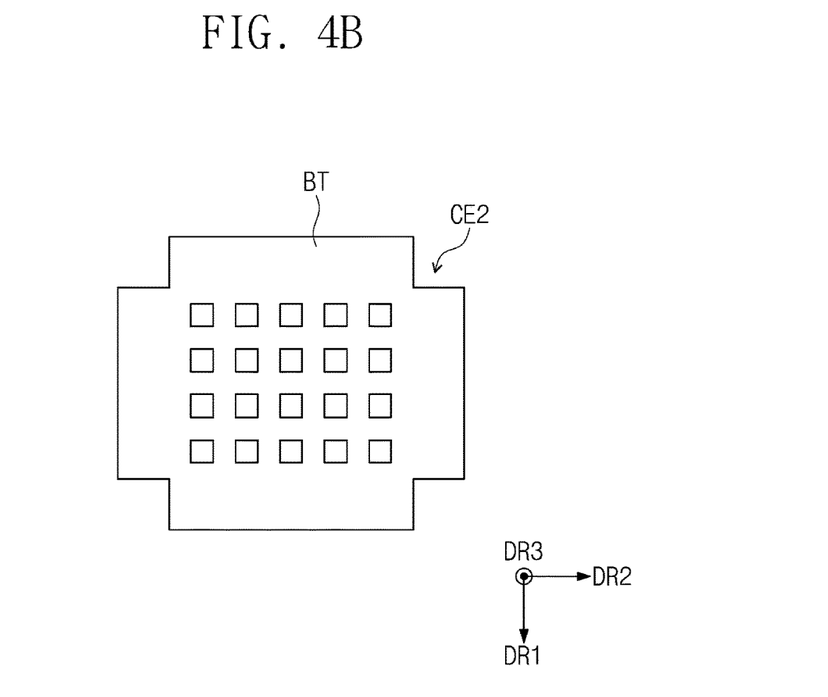

FIGS. 4A and 4B are plan views of a bottom plate of a moisture permeability measuring device according to some embodiments of the inventive concept viewed from a third direction. The same reference numerals are used for the elements described with reference to FIG. 1 to FIG. 3, and further description thereof is omitted.

Referring to FIG. 4A, in an embodiment, when viewed on a plane, the bottom plate BT may have first cut grooves CE1 extended from ends of corners of the bottom plate BT defined therein. That is, the ends of the corners may each correspond to a vertex of the bottom plate BT. The first cut grooves CE1 may be cut to a length (e.g., a predetermined length) from the ends of the corners toward the center.

Referring to FIG. 4B, in an embodiment, when viewed on a plane, the bottom plate BT may have the vertex of the bottom plate BT removed therefrom. For example, the bottom plate BT may be provided with second cut grooves CE2 having a quadrangular shape.

The shape of the holder HD may be easily deformed by the first cut grooves CE1 and the second cut grooves CE2. When the holder HD is bent, the first cut grooves CE1 and the second cut grooves CE2 allow four sides of the holder HD to be on the same plane. Accordingly, the first cut grooves CE1 and the second cut grooves CE2 may have any of various shapes for allowing the four sides to be on the same plane, and are not limited to any one embodiment.

Figure 5A:
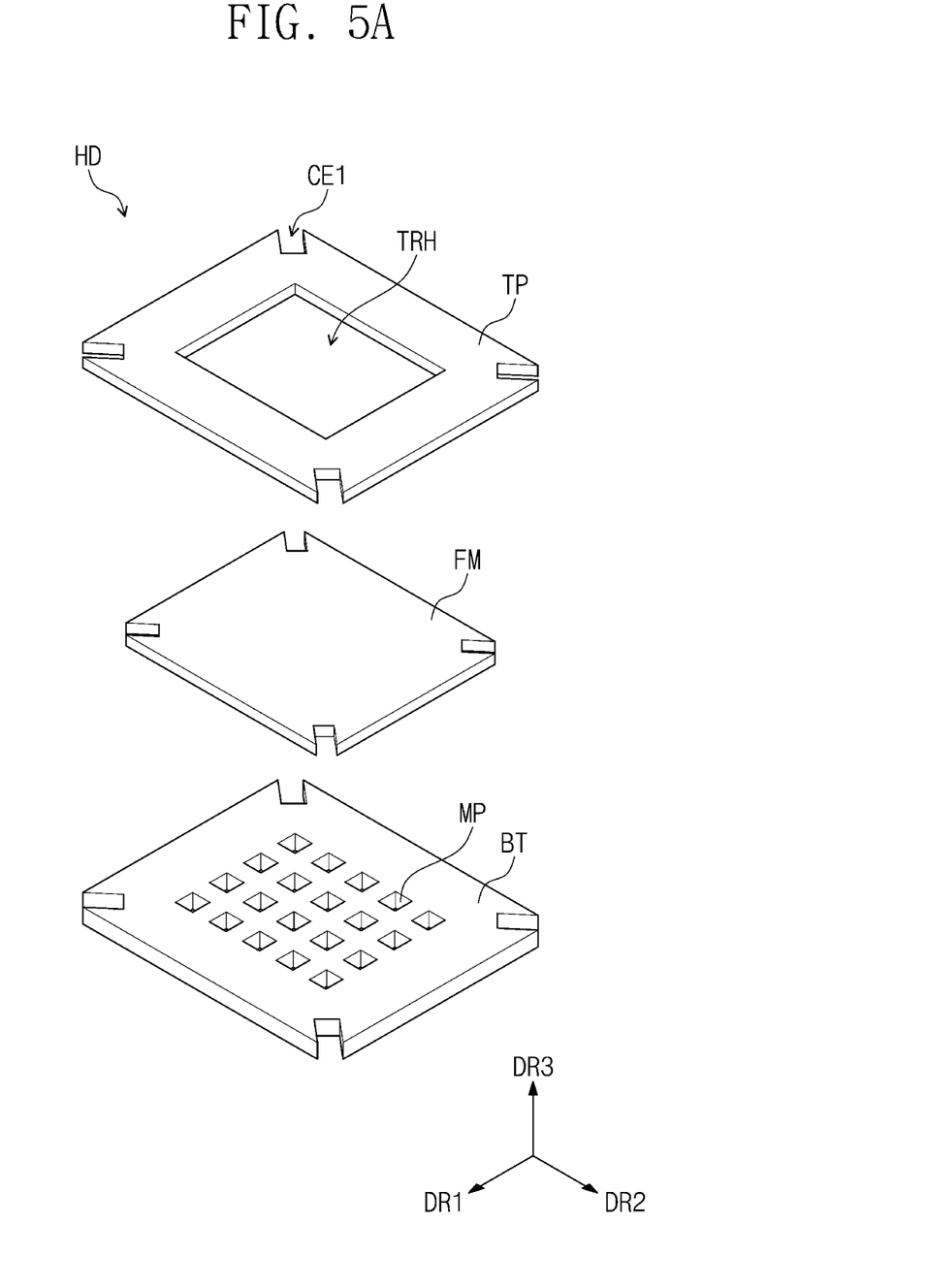
FIGS. 5A and 5B are exploded perspective views showing a holder of a moisture permeability measuring device according to some embodiments of the inventive concept.
Figure 5B:
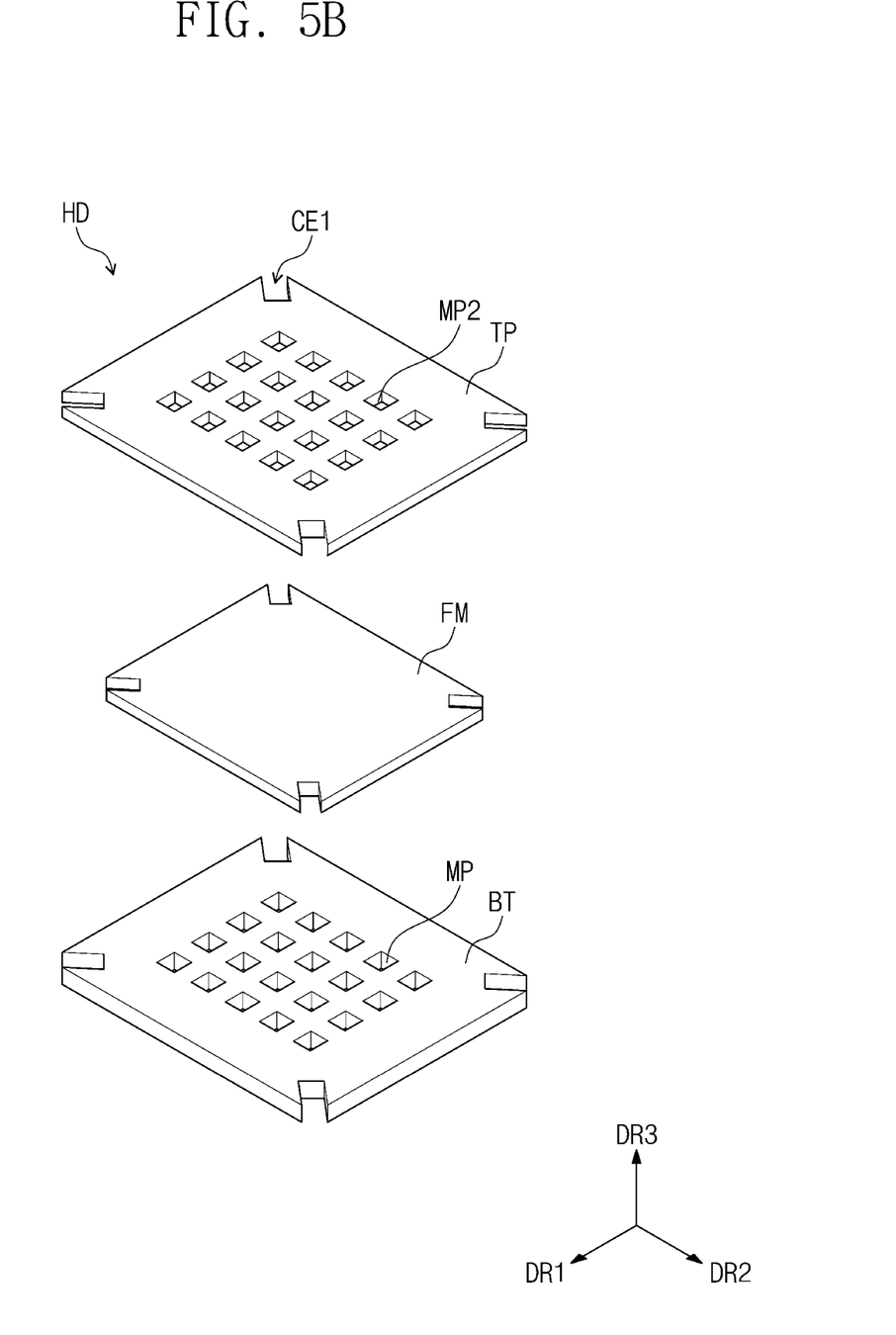

FIGS. 5A and 5B are exploded perspective views showing a holder of a moisture permeability measuring device according to some embodiments of the inventive concept. The same reference numerals are used for the elements described with reference to FIG. 1 to FIG. 4A and FIG. 4B, and further description thereof is omitted.

Referring to FIG. 5A, in an embodiment, the top plate TP may have an upper opening TRH defined therein. The upper opening TRH allows the sample FM to be exposed to the outside so as to be supplied with water vapor through the through-hole HA (see FIG. 2).

Referring to FIG. 5B, in an embodiment, the top plate TP may include a second net pattern portion MP2. However, this is only an example, and the pattern of the second net pattern portion MP2 may be substituted with any of various shapes. For example, the second net pattern portion MP2 may be substituted with a bar shape extending in one direction, or a cross-shape.

Figure 6A:
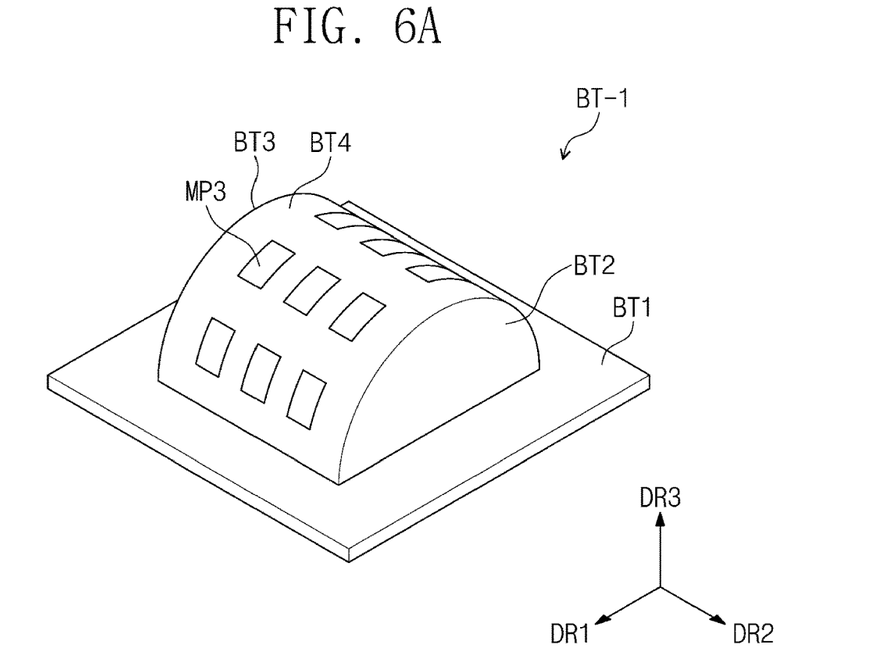
FIG. 6A is a perspective view showing a bottom plate of a moisture permeability measuring device according to an embodiment of the inventive concept.
Figure 6B:
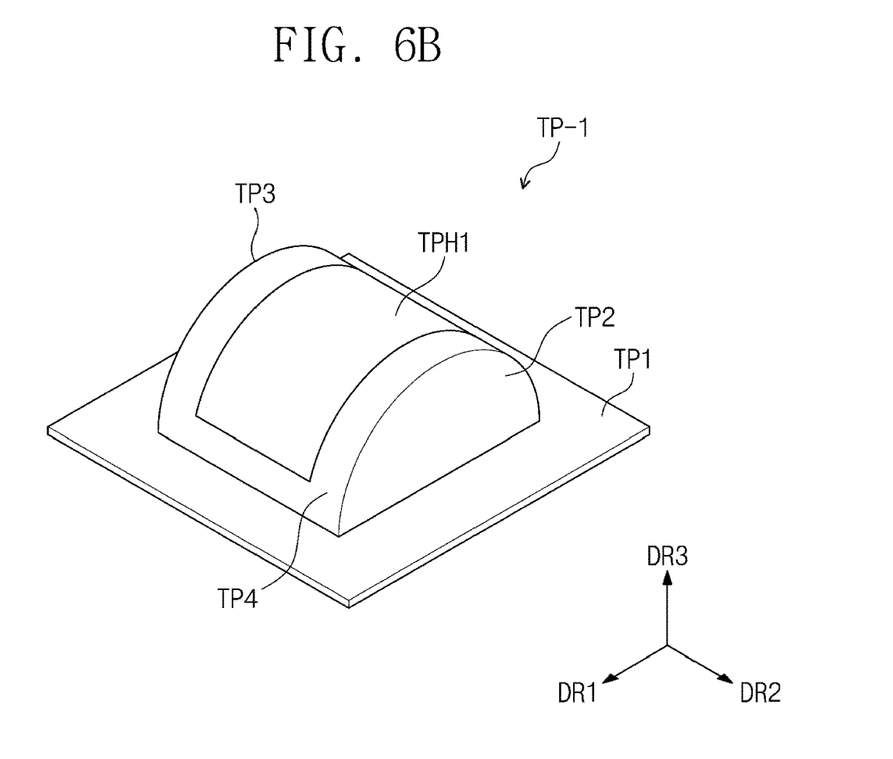
FIG. 6B is a perspective view showing a top plate of a moisture permeability measuring device according to an embodiment of the inventive concept.

FIG. 6A is a perspective view showing a bottom plate of a moisture permeability measuring device according to an embodiment of the inventive concept; and FIG. 6B is a perspective view showing a top plate of a moisture permeability measuring device according to an embodiment of the inventive concept.

Referring to FIG. 6A, a bottom plate BT-1 according to an embodiment of the inventive concept may include a lower edge portion BT1, lower protrusions BT2 and BT3 protruding from the lower edge portion BT1 in the third direction DR3, and a lower support portion BT4 for connecting the lower protrusions BT2 and BT3. The outermost portion of each of the lower protrusions BT2 and BT3 may have a curvature. In an embodiment, for example, the lower protrusions BT2 and BT3 may have a semi-circular shape with a radius (e.g., a predetermined radius). According to an embodiment of the inventive concept, the radius of the lower protrusions BT2 and BT3 may be adjusted to control the curvature of the sample FM. Accordingly, the moisture permeability measuring device 1000 (see FIG. 2) may change the sample FM (see FIG. 2) to have any of various curvatures and measure the moisture permeability. However, this is only an example, and the lower protrusions BT2 and BT3 may have any of various shapes, and are not limited to any one embodiment.

In an embodiment, the lower support portion BT4 may include a third net pattern portion MP3. The third net pattern portion MP3 of the lower support portion BT4 may prevent or substantially prevent the sample FM from falling down. However, this is only an example, and the pattern of the third net pattern portion MP3 may be substituted with any of various shapes. For example, the third net pattern portion MP3 may be substituted with a bar shape extending in one direction, or a cross-shape.

Referring to FIG. 6A, a top plate TP-1 according to an embodiment of the inventive concept may include an upper edge portion TP1, upper protrusions TP2 and TP3 protruding from the upper edge portion TP1 in the third direction DR3, and an upper support portion TP4 for connecting the upper protrusions TP2 and TP3. The outermost portion of each of the upper protrusions TP2 and TP3 may have a curvature. In an embodiment, for example, the upper protrusions TP2 and TP3 may have a semi-circular shape with a radius (e.g., a predetermined radius). In an embodiment, the radius of the upper protrusions TP2 and TP3 may be determined corresponding to the radius of the lower protrusions BT2 and BT3.

The upper support portion TP4 may have an upper opening TPH1 defined therein. The upper opening TPH1 allows the sample FM to be exposed to the outside so as to be supplied with water vapor through the through-hole HA (see FIG. 2) in order to measure water permeability.

The top plate TP-1 is disposed on the bottom plate BT-1 and may cover the bottom plate BT-1. The top plate TP-1 and the bottom plate BT-1 may constitute a holder for uni-axial bending. The moisture provided through the through-hole HA by the lower protrusions BP2 and BP3, the upper protrusions TP2 and TP3, the lower edge portion BT1, and the upper edge portion TP1 must pass through the sample FM to be provided to the sensing member 30 (see FIG. 2).

FIG. 7 is a cross-sectional view taken along the line A-A' of FIG. 1. The same reference numerals are used for the elements described with reference to FIG. 1 to FIG. 2, and further description thereof is omitted.

Referring to FIG. 7, the moisture permeability measuring device 1000 may include the first body member 100, the second body member 200, and the sensing body member 300.

In the first groove 330 of the sensing body member 300, the sensing member 30 deposited with calcium (Ca) may be disposed. In the third groove 310 of the sensing body member 300, the moisture removing agent 50 may be disposed. The lower surface of the first body member 100 may be disposed in close contact with the upper surface of the sensing body member 300. The moisture removing agent 50 may absorb moisture remaining between the sensing body member 300 and the first body member 100 to remove the moisture.

The first body member 100 may be provided with the first coupling groove 110, through which the second body member 200 may be inserted to be coupled to the first body member 100.

On the bottom surface of the first coupling groove 110 provided to the first body member 100, the first groove 120 may be provided. In the first groove 120, the moisture removing agent 50 may be disposed. The moisture removing agent 50 disposed in the first groove 120 may absorb and remove moisture between the first body member 100 and the second body member 200.

On the bottom surface of the first coupling groove 110 of the first body member 100, the seating part AN may be provided. The seating part AN may be provided spaced apart from the first groove 120. The seating part AN may be defined as a portion having a concave shape from the bottom surface of the first coupling groove 110. In the seating part AN, the holder HD (see FIG. 2) may be disposed.

The holder HD may include the bottom plate BT and the top plate TP. The holder HD may be disposed in the seating part AN in a bent state. In an embodiment, the holder HD may further include an adhesive portion (not shown) for fixing the sample FM between the bottom plate BT and the top plate TP.

As the coupling protrusion 210 of the second body member 200 is coupled to the first coupling groove 110 of the first body member 100, the second body member 200 and the first body member 100 may be assembled.

When water vapor is supplied through the through-hole HA of the second body member 200, the assembled moisture permeability measuring device 1000 may confirm whether the sample FM is permeable to moisture and the degree of moisture permeation through the sensing member 30.

In an embodiment, since the sensing member 30 is deposited with calcium, moisture transmitted by the sample FM and contacting the sensing member 30 oxidizes the calcium. In an embodiment, as the calcium of the sensing member 30 is oxidized, it is possible to determine whether the sample FM is permeable to moisture and measure the moisture permeation rate by sensing a change in the electrical properties of the sensing member 30.

According to embodiments of the inventive concept, a moisture permeability measuring device of an encapsulated sample for multi-bending is provided to measure the performance of the encapsulated sample in a deformed state. Accordingly, it is possible to analyze the performance of an encapsulated sample applied to a device such as a flexible display having an actual flexible shape and an electronic paper.

Although the inventive concept has been described with reference to some example embodiments of the inventive concept, it will be understood by those skilled in the art that various changes in form and details may be made therein without departing from the spirit and scope of the inventive concept. Accordingly, the technical scope of the inventive concept is not intended to be limited to the content set forth in the detailed description of the specification, but is intended to be set forth in the appended claims.

What is claimed is:

1. A moisture permeability measuring device comprising:
   a first body member comprising a through hole and a seating part outside a perimeter of the through hole;
   a flexible bottom plate to be arranged on the seating part and comprising a support portion to overlap the through hole of the first body member, the support portion having at least one opening;
   a flexible top plate to be arranged on the bottom plate;
   a holder part to fix a lower edge portion of the bottom plate and an upper edge portion of the top plate; and
   a second body member to be arranged on the holder part and having a through-hole defined in a region overlapping the top plate, wherein an area of the seating part on a plane is smaller than an area of the bottom plate on the plane.

2. The moisture permeability measuring device of claim 1, wherein the bottom plate has a net pattern shape.

3. The moisture permeability measuring device of claim 1, wherein the top plate has an upper opening.

4. The moisture permeability measuring device of claim 1, wherein the top plate has a net pattern shape.

5. The moisture permeability measuring device of claim 1, wherein a thickness of the bottom plate is greater than a thickness of the top plate.

6. The moisture permeability measuring device of claim 1, wherein the bottom plate has a cut groove extended from an end of a corner of the bottom plate.

7. The moisture permeability measuring device of claim 1, wherein the top plate has a cut groove extended from an end of a corner of the top plate.

8. The moisture permeability measuring device of claim 1, wherein the top plate and the bottom plate are arranged in the seating part in a bent state.

9. The moisture permeability measuring device of claim 8, wherein the top plate and the bottom plate are arranged in the seating part in a state bent in two axes.

10. The moisture permeability measuring device of claim 1, wherein each of the bottom plate and the top plate comprises butyl, ethylene propylene, chloroprene, or silicone rubber sheet.

11. The moisture permeability measuring device of claim 1, wherein the seating part has a quadrangular shape and an edge of each of the bottom plate and the top plate has a quadrangular shape.

12. A moisture permeability measuring device comprising:
- a first body member comprising a through hole and a seating part outside a perimeter of the through hole;
- a bottom plate to be arranged on the seating part and comprising a lower edge portion, lower protrusions protruding upward from the lower edge portion, and a lower support portion to overlap the through hole of the first body member and connecting the lower protrusions, the lower support portion having at least one opening;
- a top plate to be arranged on the bottom plate and covering the bottom plate;
- a holder part to fix the lower edge portion of the bottom plate and an upper edge portion of the top plate; and
- a second body member to be arranged on the holder part and having a through-hole defined in a region overlapping the top plate.

13. The moisture permeability measuring device of claim 12, wherein an outermost portion of each of the lower protrusions of the bottom plate has a curvature.

14. The moisture permeability measuring device of claim 12, wherein the lower support portion of the bottom plate has a bent shape.

15. The moisture permeability measuring device of claim 14, wherein the lower support portion of the bottom plate has a shape bent in an axis.

16. The moisture permeability measuring device of claim 12, wherein the lower support portion of the bottom plate has a net pattern shape.

17. The moisture permeability measuring device of claim 12, wherein the top plate comprises an upper edge portion, upper protrusions protruding upward from the upper edge portion, and an upper support portion connecting the upper protrusions.

18. The moisture permeability measuring device of claim 17, wherein the upper support portion of the top plate has an upper opening.

* * * * *